A. J. JOHNSON.
Milking-Pails.

No. 142,917. Patented September 16, 1873.

Witnesses:

Inventor:
Andrew J. Johnson
By Johnson and Johnson
his Attorneys.

UNITED STATES PATENT OFFICE

ANDREW J. JOHNSON, OF VICKSBURG, MICHIGAN, ASSIGNOR OF ONE-HALF HIS RIGHT TO NELSON V. JONES, OF SAME PLACE.

IMPROVEMENT IN MILKING-PAILS.

Specification forming part of Letters Patent No. 142,917, dated September 16, 1873; application filed August 1, 1873.

*To all whom it may concern:*

Be it known that I, ANDREW J. JOHNSON, of the village of Vicksburg, in the county of Kalamazoo, in the State of Michigan, have invented certain new and useful Improvements in Milking-Pails, of which the following is a specification:

My invention relates to milking-pails which of themselves constitute the seat or stool for the milk-maid; and my said improvement consists in the combination of an angular guard or shield with the receptacle for the milk and the elevated elbow discharge-opening in the side thereof, to prevent the overflow of the froth as it gathers at the outlet of the receptacle, the said outlet being used with a flat-bottomed receptacle and arranged above the same, and the guard arranged directly above and to incline over and around said elbowed discharge, to effect the purpose stated, when applied to a milk-receiving cup having an adjustable connection with the seat of the pail.

Figure 1:
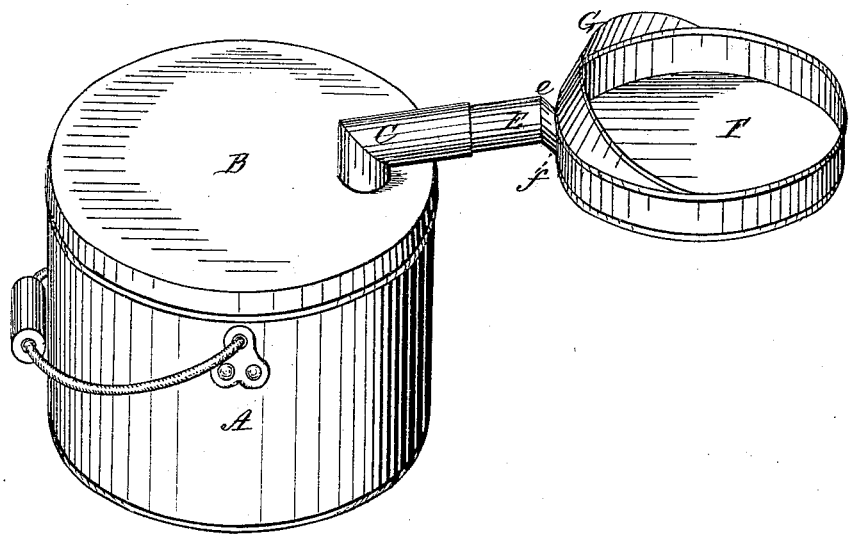
Figure 2:
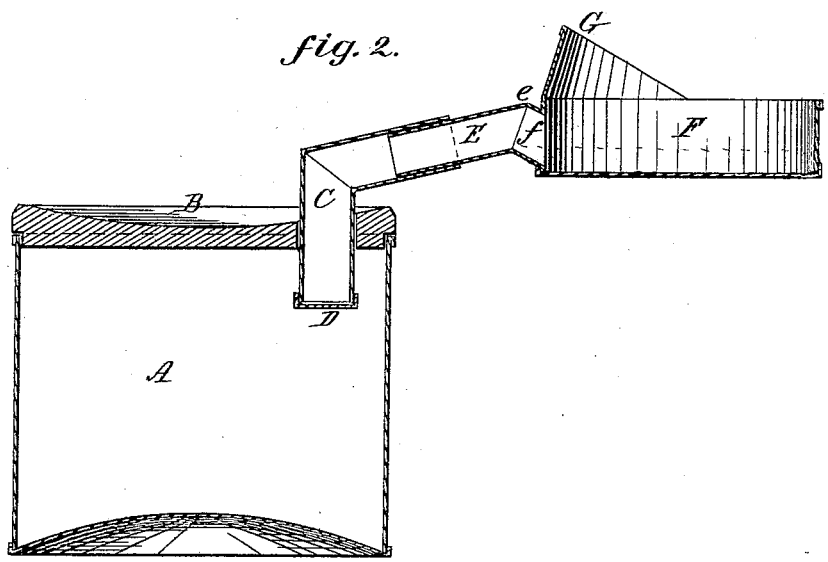

In the accompanying drawings, Figure 1 represents a view in perspective of my improved milking-pail, and Fig. 2 a vertical section.

The pail A is of any suitable construction and material. It is provided with a cover, B, of wood or metal. Through an aperture in this cover an elbowed pipe or spout, C, is inserted, which projects a short distance into the pail and is provided with a removable cap gauze strainer, D, which may be readily taken off and cleaned after each milking. Fitting within this pipe C is another pipe or spout, E, to which is attached a milk-receptacle, F, having a flat bottom. This receptacle is provided with a guard, G, which prevents the splattering of the milk and the overflow of the froth, which collects in quantities near the point of exit *f* into the spout. The spout E is elbowed at *e* to form an upward-inclined exit, *f*, for the milk, whereby the milk-receptacle is kept about a quarter full, so that the milk from the udders will be received into the froth and milk and avoid any splattering. The spout is made to rest tightly in the cover B, so as to be adjustable vertically, to accommodate itself to a tall or short cow. The pipe C is also made to shift itself horizontally, as upon a pivot, in any position to the udders, so that, when the cow moves, the milk-maid need not rise and move the can or pail, and, unless the cow be more than ordinarily restless, the milking may be accomplished without rising from or moving the stool-pail.

The advantages of my invention are apparent to those who are familiar with milking, as, by means thereof, the person milking need not be incommoded in the slightest degree, and, besides, it is readily attached to any of the ordinary milk-pails in use.

The swinging milk-receiver may be attached to the side of the pail, if desired.

Having described my invention, I claim—

The inclined guard G, in combination with the flat-bottomed milk-receptacle F and the side elbowed outlet E *f*, as shown and for the purpose described.

ANDREW J. JOHNSON.

Witnesses:
 THOS. B. FINLAY,
 N. V. JONES.